US012313081B2

(12) United States Patent
Frantz et al.

(10) Patent No.: US 12,313,081 B2
(45) Date of Patent: May 27, 2025

(54) MODULE FOR MOUNTING A TURBOMACHINE FAN BLADE

(71) Applicant: SAFRAN AIRCRAFT ENGINES, Paris (FR)

(72) Inventors: Caroline Marie Frantz, Moissy-Cramayel (FR); Vincent François Georges Millier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/711,438

(22) PCT Filed: Nov. 16, 2022

(86) PCT No.: PCT/FR2022/052109
§ 371 (c)(1),
(2) Date: May 17, 2024

(87) PCT Pub. No.: WO2023/089274
PCT Pub. Date: May 25, 2023

(65) Prior Publication Data
US 2025/0020139 A1 Jan. 16, 2025

(30) Foreign Application Priority Data
Nov. 19, 2021 (FR) ........................... 2112278

(51) Int. Cl.
*F04D 29/36* (2006.01)
*B64C 11/06* (2006.01)

(52) U.S. Cl.
CPC ............ *F04D 29/362* (2013.01); *B64C 11/06* (2013.01); *F05D 2220/36* (2013.01); *F05D 2260/74* (2013.01)

(58) Field of Classification Search
CPC ...... F04D 27/002; F04D 29/323; F04D 29/36; F04D 29/46; F04D 29/646; F04D 29/322;
(Continued)

(56) References Cited

U.S. PATENT DOCUMENTS 4,863,352 A * 9/1989 Hauser ................... F16C 19/56
416/129
5,263,898 A * 11/1993 Elston, III ............. B64C 11/06
416/129
(Continued)

FOREIGN PATENT DOCUMENTS

EP   2535519 A2 * 12/2012 ............ B64C 11/06
FR   2944774 A1    10/2010
(Continued)

OTHER PUBLICATIONS

Search Report and Written Opinion issued in International Application No. PCT/FR2022/052109, mailed Jan. 31, 2023.
(Continued)

*Primary Examiner* — Courtney D Heinle
*Assistant Examiner* — Ryan C Clark
(74) *Attorney, Agent, or Firm* — Bookoff McAndrews, PLLC (57) ABSTRACT

Module for mounting a turbomachine fan blade, including: a blade force take-up device, a blade support able to pivot about a radial axis and configured to be engaged axially inside the device, the support and the device being mutually configured to ensure a clamping of the support against the device and an axial retention of the support inside the device; the support and the device each including, on their respective surfaces in cooperation, an alternation of conical seats and recesses making it possible alternatively, on the one hand, when the recesses of one surface are in geometric correspondence with the seats of the other surface, to axially (Continued)

slide the support relative to the device, and on the other hand, when the seats of both surfaces are in geometric correspondence with each other, to prevent any axial sliding movement of the support relative to the device.

16 Claims, 5 Drawing Sheets

(58) Field of Classification Search
CPC ..... F04D 29/34; F04D 15/0055; B64C 11/02; B64C 11/04; B64C 11/06; B64C 11/30; F05D 2220/36; F05D 2250/323; F05D 2260/70; F05D 2260/74
See application file for complete search history.

(56) References Cited

U.S. PATENT DOCUMENTS

| | | | | |
|---|---|---|---|---|
| 9,102,396 | B2* | 8/2015 | Curren | B64C 11/04 |
| 9,429,031 | B2* | 8/2016 | Perdrigeon | F02C 6/206 |
| 2008/0279689 | A1* | 11/2008 | Sebald | F16C 19/543 |
| | | | | 416/174 |
| 2010/0239421 | A1* | 9/2010 | Boston | B64C 11/48 |
| | | | | 416/136 |
| 2014/0003945 | A1 | 1/2014 | Perdrigeon et al. | |
| 2016/0017728 | A1* | 1/2016 | Fabre | F01D 5/02 |
| | | | | 416/135 |
| 2017/0159462 | A1* | 6/2017 | Whurr | F02K 3/06 |
| 2017/0166295 | A1* | 6/2017 | Derrez | B64C 11/14 |
| 2017/0313404 | A1* | 11/2017 | Colmagro | B64C 11/30 |
| 2018/0363481 | A1* | 12/2018 | Bailey | F04D 29/362 |
| 2019/0010957 | A1* | 1/2019 | Belmonte | B64C 11/06 |

FOREIGN PATENT DOCUMENTS

| | | |
|---|---|---|
| FR | 3040191 A1 | 2/2017 |
| FR | 3106364 A1 | 7/2021 |
| WO | WO-2020169896 A1 * 8/2020 | ............ B64C 11/06 |

OTHER PUBLICATIONS

Search Report issued in French Application No. 2112278, mailed Jun. 27, 2022.

* cited by examiner

MODULE FOR MOUNTING A TURBOMACHINE FAN BLADE

CROSS-REFERENCE TO RELATED APPLICATIONS

This is a National Stage Application under 35 U.S.C. § 371 of International Application No. PCT/FR2022/052109, filed Nov. 16, 2022, now published as WO 2023/089274 A1, which claims priority to French Patent Application No. 2112278, filed on Nov. 19, 2021.

TECHNICAL FIELD

The present disclosure concerns a module for mounting a turbomachine fan blade, a variable-setting assembly comprising such a module and a turbomachine fan comprising such an assembly.

The invention applies in particular to aeronautical turbomachines.

PRIOR ART

Some turbojet engines comprise a variable-setting fan in which a change in setting or orientation of the fan blades is made in order to manage the thrust of the turbojet engine appropriately according to the flight phases of the aircraft equipped with such a turbojet engine.

A variable-setting fan generally comprises a hub which extends circumferentially about a longitudinal axis of rotation of the fan and the fan blades are mounted at the periphery of the hub. More particularly, the hub comprises a plurality of hub mouths distributed circumferentially at the periphery of the hub and which each include an opening oriented radially relative to the longitudinal axis. The blades are each mounted at the level of their base in a hub mouth via a pivot receiving the base of the blade and equipped with ball rollings making it possible to take up all the forces to which the blade in operation is subjected.

The assembly called a rolling cartridge which is formed by the pivot of a blade and the part forming the rollings associated with the blade pivot is mounted from inside in a mouth of the hub, while the blade pivot is mounted in the cartridge, from outside to be positioned and held clamped inside the rolling cartridge. The blade, for its part, is mounted on the pivot from outside the hub mouth. Generally, the radial retention of the blades is ensured by the shape of the base of the blade and of the cell accommodating it, the pivot and its rollings, the hub in which the pivot is integrated and the outer casing of the fan. The hub mouth internally includes a radial stop which ensures holding the pivot in the radial position when the fan is put in operation, in particular in order to avoid any radial displacement of the assembly (pivot and rollings), away from the longitudinal axis, under the effect of the centrifugal forces due to the rotation of the fan. A mechanism internal to the hub makes it possible to pivot each blade pivot on command and therefore to pivot the blade carried by the pivot.

When mounting the pivot of the blade into the cartridge from outside the hub mouth, from outside the latter, it is necessary to couple the lower part of the pivot to a piece of the pivot mechanism in order to prevent the removal of the pivot out of the mouth along the radial axis thereof, under the action of the centrifugal forces which appear when the hub is rotated. This coupling is achieved by intervening from inside the hub and by securing the pivot and the piece of the mechanism thanks to one or several coupling members which further form an axial stop on the rolling cartridge. This operation is difficult to carry out during the first mounting of the fan but proves even more problematic when it occurs during maintenance operations (for various reasons such as for example following bird ingestion) and when the blade support must be dismounted, inspected then repaired or replaced, and remounted.

These dismounting and remounting operations prove to be long and complex and cannot always be carried out easily depending on the circumstances in which the maintenance operations must take place.

In view of the above, it would therefore be useful to have an architecture allowing the fan blade supports to be mounted and dismounted more easily than in the prior art.

DISCLOSURE OF THE INVENTION

The invention therefore relates to a module for mounting a fan blade for a turbomachine comprising:
  a blade force take-up device,
  a blade support intended to support a fan blade and able to pivot about a radial axis A, the blade support being configured to be engaged axially along the radial axis A inside the blade force take-up device, the blade support and the blade force take-up device being mutually configured to ensure, on the one hand, a clamping of the blade support against the device and, on the other hand, an axial retention along the radial axis A of the blade support inside the device in order to prevent any movement of axial disengagement of the blade support relative to the device, the blade support and the device each including, on their respective surfaces intended to cooperate with each other, an alternation of conical seats and recesses making it possible alternatively, on the one hand, when the recesses of one of the two respective surfaces are in geometric correspondence with the conical seats of the other surface, to axially slide the blade support relative to the device and, on the other hand, when the conical seats of the two respective surfaces are in geometric correspondence with each other, to prevent any axial sliding movement of the blade support relative to the device.

The architecture proposed above makes it possible to mount and dismount (in particular lock and unlock) from outside the hub mouth of the hub of a fan, more simply than in the prior art, the blade support relative to the blade force take-up device in place in the hub mouth. It is thus no longer necessary to access the inside of the hub to mechanically couple/decouple the blade support relative to the mechanism for pivoting the support internal to the hub. According to this architecture, the blade support is engaged inside the blade force take-up device in a first direction of engagement aligned with the radial axis of the mouth by performing an axial translation over a predetermined distance. The axial translation is authorized when the recesses carried by one of the two surfaces of the blade support and the blade take-up device are axially aligned with the conical seats of the other surface and can therefore axially slide relative to each other. In practice, the blade support is translated such that its conical seats are positioned beyond the conical seats of the device away from the opening of the mouth so that, by a simple rotational movement following a predetermined angle about the radial axis A, the conical seats of the blade support are in the same angular position as the conical seats of the device. By then performing an axial translation of the blade support along a second direction (of disengagement) opposite to the first direction of engagement, the conical seats of the blade support rest by sliding against the conical seats of the device where they are in conical stop, that is to say both axial and radial. The conical seats of the two respective surfaces are then in geometric correspondence with each other. Any axial sliding movement of the blade support relative to the device and tending to remove the blade support from the hub mouth in the second direction called direction of disengagement is then made impossible, which locks the blade support relative to the device without the need to intervene inside the hub. The unlocking and dismounting are performed in the reverse order of the operations described above.

According to other possible features:
- the blade force take-up device comprises an intermediate interface piece which includes, on an inner surface, a first plurality of conical seats disposed alternately with recesses circumferentially and coaxially with the radial axis A of the mouth, the conical seats being oriented such that the top of the cone of each seat is directed towards the radial opening of the mouth;
- the blade support includes, on an outer surface, a second plurality of conical seats disposed alternately with recesses circumferentially and coaxially with the radial axis A of the mouth, the conical seats of the second plurality of conical seats having the same orientation as that of the first plurality of conical seats;
- the assembly includes at least one angular setting member on a first of the two elements among the blade support and the device, said at least one angular setting member being intended to cooperate with an angular setting pocket arranged on the second element and extending transversely relative to the radial axis A.

The invention also relates to a variable-setting assembly for a turbomachine fan comprising:
- a hub extending circumferentially about a longitudinal axis of rotation X-X' of the hub and comprising a plurality of hub mouths distributed circumferentially on an outer periphery of the hub, each hub mouth internally delimiting an opening oriented radially relative to the longitudinal axis and allowing access to the inside of the hub mouth,
- for each hub mouth, a module for mounting a fan blade as briefly explained above.

According to other possible features:
- the assembly includes an eccentric system for controlling the pivoting of the blade support, which is configured to control the pivoting of the blade support about the radial axis of the mouth;
- the eccentric system for controlling the pivoting of the blade support comprises a piece forming an eccentric which is configured to engage with a lower part of the blade support which is opposite to an upper part of the blade support disposed in a radial position remote from the longitudinal axis and intended to receive a fan blade;
- the lower part of the blade support carries outer splines which are configured to mesh with inner splines of an engagement end of the eccentric;
- the engagement end of the eccentric has the general shape of a cylindrical pad open at its upper part oriented towards the radial opening of the mouth and which is provided, on its internal surface, with the inner splines;
- the outer splines of the lower part of the blade support are disposed at a distance, taken along the radial axis A, from the conical seats of the blade support which is such that the outer splines are in geometric correspondence with the inner splines of the engagement end when the respective conical seats of the blade support and of the device are in geometric correspondence with each other;
- the conical seats of the blade support are disposed between the angular setting member or pocket, depending on whether the member is carried by the blade support or the device, and the outer splines;
- the engagement end of the eccentric is also configured to be removably mechanically coupled with a lower part of the hub mouth which is opposite to the radial opening of the latter;
- the engagement end of the eccentric includes an assembly of double concentric cylindrical wall open at its upper part towards the radial opening of the mouth and comprising, on the one hand, a first outer wall which is removably mechanically coupled with the lower part of the mouth and, on the other hand, a second inner wall which is provided on its inner face with the splines configured to mesh with the outer splines of the lower part of the blade support;
- the blade force take-up device is also configured to be placed in the hub mouth through the opening of the latter.

The invention also relates to a turbomachine fan which comprises a variable-setting assembly for a turbomachine fan as briefly explained above.

According to one feature, the fan comprises a plurality of fan blades each mounted on a blade support of a mounting module of a hub mouth.

The invention also relates to a turbomachine comprising a fan as briefly explained above.

BRIEF DESCRIPTION OF THE DRAWINGS

Other features and advantages of the object of the present disclosure will emerge from the following description of embodiments, given by way of non-limiting examples, with reference to the appended figures.

DETAILED DESCRIPTION

The invention applies to any turbomachine equipped with at least one ducted or unducted fan whose fan blades (ducted fan) or propeller airfoils (unducted fan) are equipped with a setting or orientation change assembly, also called variable-setting assembly.

The following detailed description concerns embodiments of a ducted fan of a turbomachine for an aircraft comprising a variable-setting assembly of the fan blades.

Figure 1:
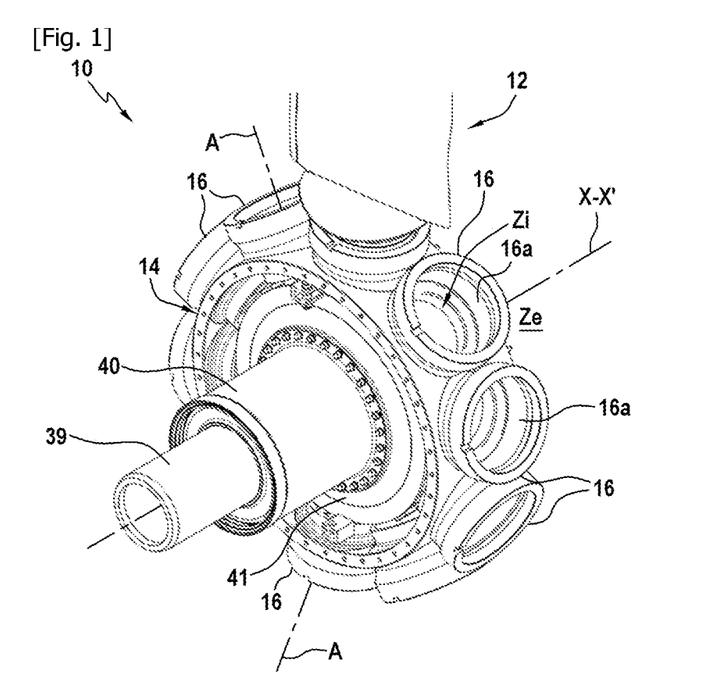
FIG. 1 is a partial schematic perspective representation of a turbomachine fan according to the invention.

As represented in FIG. 1 and generally designated by the reference noted 10, a fan comprises a plurality of blades only one of which, noted 12, is partially represented.

The fan comprises a hub 14 extending circumferentially about a longitudinal axis of rotation X-X' of the hub and comprises a plurality of hub mouths 16 distributed circumferentially on an outer periphery of the hub.

Each hub mouth 16 internally delimits an opening 16a oriented radially, along an axis A having a radial orientation relative to the longitudinal axis X-X'. The hub mouths 16 are thus all oriented as a star relative to the hub, each along a radial axis A. The radial opening 16a has a passage section which extends perpendicularly to the radial axis A and which is able to put into communication a peripheral area Ze external to the hub mouth 16, located away from the longitudinal axis X-X', with an inner peripheral area Zi of the hub mouth, which is closer to the longitudinal axis. In other words, the hub mouth 16 has a through opening 16a along the radial axis.

As represented in FIG. 1, the hub 14 includes in its central inner part, from the center outward, a control means comprising here a fixed piston 39 of a control cylinder and the movable chamber 40 thereof, as well as a connecting piece 41 between this control cylinder and connecting rods 42 illustrated in FIG. 2 and described below.

As represented in FIG. 1, a blade 12 is represented mounted in a hub mouth 16. The other mouths are empty so as not to complicate the drawing but a blade is also normally mounted in each of them.

Figure 2:
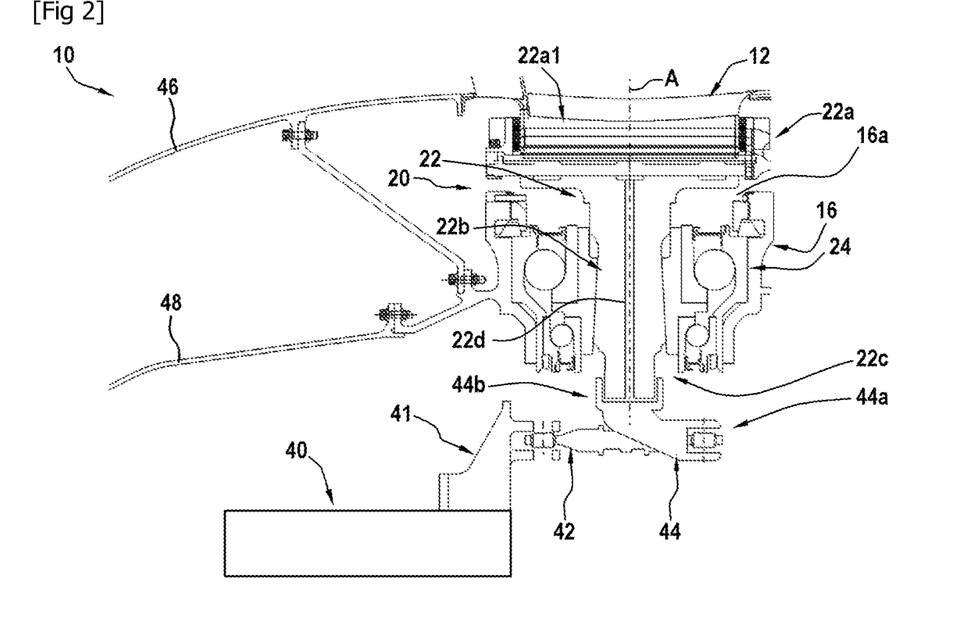
FIG. 2 is a partial schematic representation in axial section of the fan partially represented in FIG. 1 according to a first embodiment of the invention.
Figure 3:
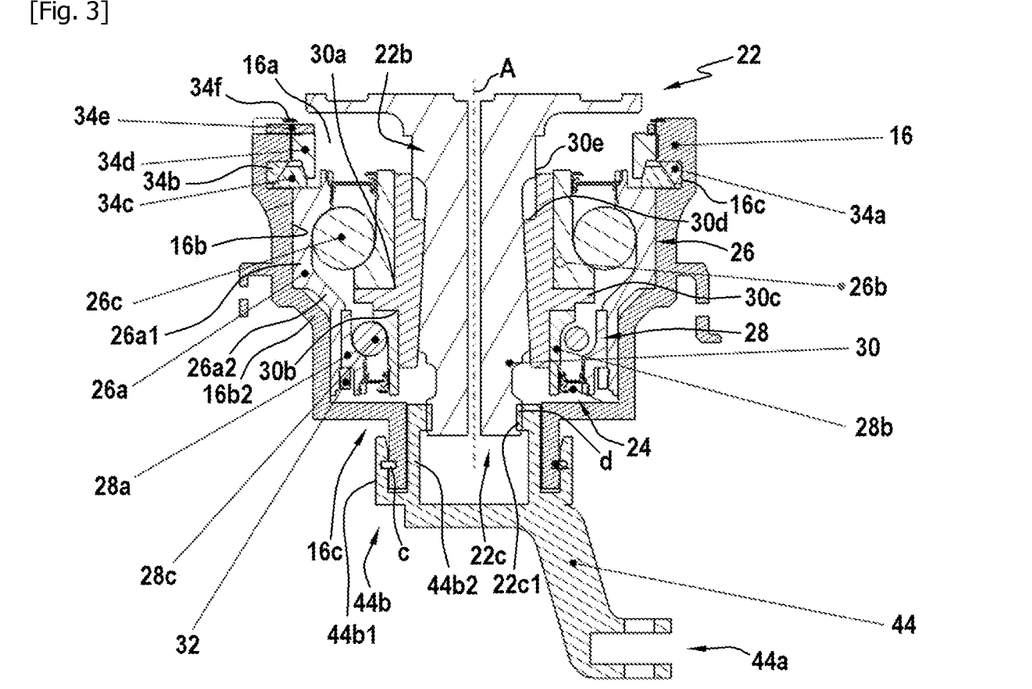
FIG. 3 is an enlarged and more detailed partial schematic representation of the fan blade mounting module integrated into the hub mouth of FIG. 2.

FIG. 2 represents, in axial section along the axis X-X', a part of the fan which comprises a hub mouth 16 in which a module 20 for mounting a fan blade 12 is integrated (the module 20 is represented in more detail in FIG. 3). This module 20 forms part of a variable-setting assembly of the fan blades according to one embodiment of the invention which comprises the hub 14 and other modules 20 for the other fan blades.

The fan blade mounting module 20 comprises two main components, namely a blade support or pivot 22 and a blade force take-up device 24 which is in contact with the support. In the embodiment described, the module 20 is configured to be placed in the hub mouth 16 through the radial opening 16a of the latter, from a peripheral area Ze external to the mouth (FIGS. 1 and 2). In the present mode, these module and hub mouth configurations allow placing the module from outside the hub, which simplifies the maintenance operations when it comes to removing the module from the mouth (from outside this mouth) to access the inner components of the module. Likewise, the inspected module, and possibly repaired or replaced, is replaced from outside the hub. It is therefore no longer necessary to dismount the entire inner cowling of the fan and the inner mechanisms for the control of the pivoting of the blades. A considerable amount of time is thus saved and the maintenance costs are greatly reduced. The risk of damage to the surrounding structures in place in the fan is also reduced.

More particularly, the blade support 22 ensures, on the one hand, the retention of the fan blade as long as the support is held in position in the blade force take-up device (for example via the segments 36a and 36b as will be described later) and, on the other hand, its guidance for the setting of its pitch (angular orientation of the blade relative to the radial axis A passing through the hub mouth).

Figure 4:
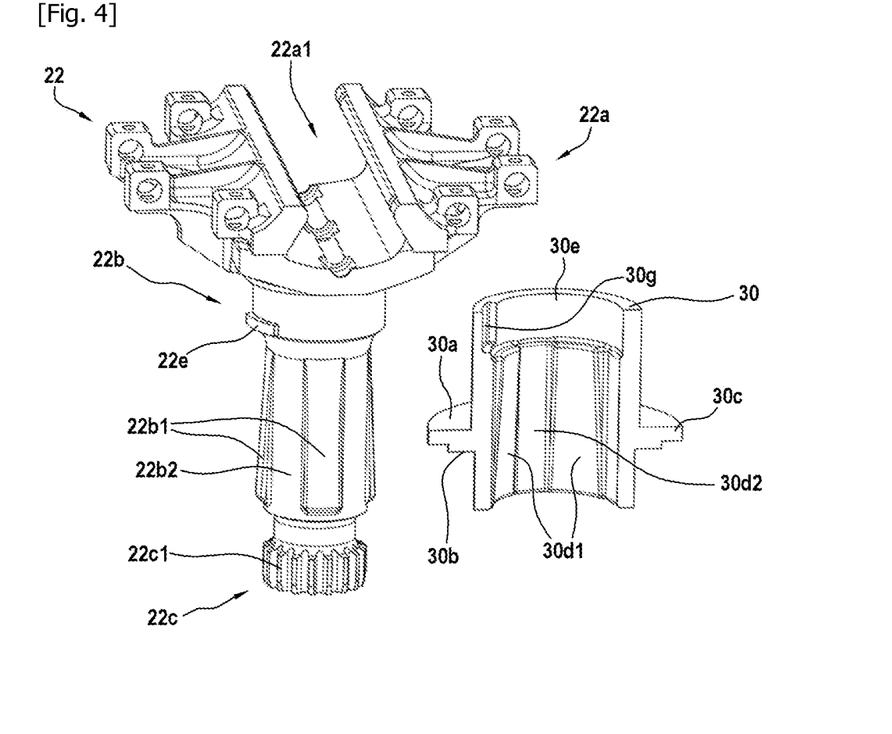
FIG. 4 represents in perspective an example of a blade support and an example of an intermediate interface piece of the blade take-up device used in FIGS. 2 and 3.

The blade support 22 is intended to support the fan blade 12 and, for this purpose, it includes an upper part 22a (FIGS. 2 and 4) in which a cell 22a1 is arranged which has the function of receiving the base of the blade (not represented in FIG. 4) and holding the latter in position, for example, thanks to a dovetail type mounting. As represented in FIGS. 2 to 4, the upper part 22a forms a plate which overcomes or extends a lower central pad or base 22b of generally substantially cylindrical shape.

The blade support 22 is able to pivot about the radial axis A of the hub mouth 16 under the action of an eccentric control mechanism which will be described later and which interacts with the proximal lower part 22c of the support (part opposite to the distal upper part 22a and which is located at the lower end of the pad 22b) disposed inside the hub and in the vicinity of the axis X-X' as opposed to the distal part 22a.

As represented in FIG. 2, the blade support 22 is pierced in its center with a through channel 22d (the channel crosses the plate and the pad) intended for example to allow the passage of strain gauges or of a blade de-icing system.

The blade force take-up device 24 for its part forms in this example a unitary block which is mounted in one piece before the blade support 22, inside the hub mouth 16, passing through the radial opening 16a, from a peripheral area Ze external to the mouth.

The blade force take-up device 24 is placed by being held clamped against an inner surface 16b of the hub mouth 16, a surface which is disposed in a transverse position relative to the radial axis A (a transverse direction extending perpendicular to the radial axis). The inner surface 16b extends substantially parallel to the axis A on a first portion 16b1 from the opening 16a, then forms a second converging portion 16b2 (here as a funnel with a throat of generally frustoconical shape followed by a terminal portion substantially parallel to the axis A) tightening the space internal to the mouth away from the opening 16a (towards the axis X-X'). This narrowing forms a stop along the radial axis A for the module 20, towards the inside of the hub (towards the axis X-X').

The device 24 comprises in this example an assembly formed of at least two ball rolling bearings:
- an external bearing 26 disposed, relative to the radial axis A, in a transverse position farthest from this axis, and
- an internal bearing 28 disposed in a transverse position closest to the radial axis A relative to the outer transverse position of the external bearing 26. It will be noted that the notion of external and internal of the bearings also refers directly to the position of each of these bearings relative to the longitudinal central axis X-X'.

The external bearing 26 is configured to take up the radial (along the radial axis A) and transverse (along an axis perpendicular to the radial axis A) forces transmitted by the blade during operation of the fan (rotation about the axis X-X') and is disposed in a radial position (along the radial axis A) farthest from the longitudinal axis X-X' than the radial position of the internal bearing 28. The internal bearing is configured to take up the transverse or tangential forces transmitted by the blade during operation of the fan, while the external bearing 26 (of larger dimensions than the internal bearing 28) is configured to take up radial forces along the radial axis A (forces due to the centrifugal force) which are the greatest forces to which the device 24 is subjected during the rotation of the blade. It will be noted that the modules 20 are mounted radially in a star relative to the hub 14 such that the orientation of each module in space varies as a function of the angular position of the hub mouth considered.

As more particularly represented in FIG. 3, the external bearing 26 includes an outer ring 26a, an inner ring 26b and ball rollings 26c jointly enclosed by the two rings.

Likewise, the internal bearing 28 includes an outer ring 28a, an inner ring 28b and ball rollings 28c jointly enclosed by the two rings.

The outer ring 26a of the external bearing 26 is disposed in an outer transverse position farthest from the radial axis A of the mouth than the transverse position of the rollings 26c and 28c of the external 26 and internal 28 bearings. The outer ring 26a extends substantially parallel to the radial axis A along the rollings 26c of the external bearing and going down along the outer ring 28a of the internal bearing 28, and bears against this outer ring 28a. It will be noted that the outer ring 26a extends downwards (towards the internal bearing) following the profile of the inner surface 16b of the mouth with which it is in contact, that is to say by first adopting a substantially rectilinear portion 26a1, then by tightening so as to adopt a converging portion 26a2 (throat forming a frustoconical portion followed by a rectilinear portion). A clamping element 32 of the internal bearing 28 can be disposed in an outer transverse position relative to the internal bearing 28 and the lower tightened part of the outer ring 26a of the external bearing 26 bears on this clamping element. This clamping element ensures preload or pre-stress of the internal bearing 28.

This clamping element 32 is for example a clamping nut screwed onto the inside of the outer ring 26a of the outer bearing 26. For example, a key 34e and a circlip 34f ensure the non-loosening of the clamping element 32, as described below, although other members ensuring non-loosening of the element 32 can be alternatively envisaged.

The device 24 also comprises an intermediate interface piece 30 disposed between, on the one hand, the external 26 and internal 28 bearings and, on the other hand, the blade support 22. The piece 30 forms part of the block 24 or of an equivalent block equipped with bearings configured differently and serves as a mechanical interface with the support 22. Such an interface makes it possible to avoid wearing out the rings of the rollings if they were directly in contact with the blade support 22. The piece 30 will be described in more detail later in conjunction with the blade support during the description of the placement and locking of the blade support inside the force take-up device 24, and in particular of the interface piece 30. In the device 24 described above, the internal bearing 28 is housed in the outer ring of the external bearing 26, as well as the intermediate interface piece 30 which makes it possible to connect the internal rings and provide a support to the blade support 22, thus making it possible to form a "cartridge" containing the rolling bearings and which can be handled in a single unitary block (in one piece) by an operator wishing to install the device in a hub mouth (from outside the hub) or to remove it (always from outside).

The inner ring 26b, 28b of each of the external and internal bearings is disposed in an inner transverse position relative to the outer transverse position of the rollings 26c, 28c of each bearing which is farther from the radial axis A. Each inner ring is housed in an arrangement 30a, 30b provided on a radially outer surface of the intermediate interface piece 30. More particularly, the piece 30 includes, on its outer surface oriented towards the rollings, an outer peripheral flange 30c which delimits above and below it an upper space and a lower space to respectively receive the inner rings 26b and 28b. The interface piece 30 is pierced in its central part to receive axially (along the radial axis A) the blade support 22 and to cooperate with the latter as will be described later by means of conical seats on the inner surface of the piece 30. An inner shoulder 30d is for example arranged at the upper part of the piece 30 in order to form an axial stop for the support 22 which includes on its outer surface an outer shoulder of adapted complementary diameter.

The blade force take-up device 24 can also comprise a system 34 for holding in position and clamping by wedge effect all the rolling bearings 26, 28 inside the hub mouth 16.

This system 34 is for example positioned substantially at the opening 16a of the mouth (after placing the device 24 in the mouth), in a radial position (along the radial axis A) which is farther from the longitudinal axis X-X' than the external bearing 26. In FIG. 3, the system 34 is disposed above the bearing 26.

The system 34 for holding in position and clamping by wedge effect is for example a keystone type system which clamps the rolling bearing cartridge against the inner surface 16b of the mouth. Such a system 34 comprises, for example, two segments in two half-shells 34a-b, clamping pieces 34c (distributed circumferentially and internally to the segments), a clamping nut 34d, as well as an anti-rotation key 34e and a circlip 34f. The segments 34a-b and the clamping pieces 34c ensure that the bearing cartridge is held in radial position (along the radial axis A) and clamped against the inner surface 16b of the hub mouth (along a transverse direction relative to the axis A and away from it). The segments 34a-b and the outer part of the clamping pieces 34c with which the segments cooperate are in particular housed in an annular groove 16c arranged in the thickness of the wall of the hub mouth. The clamping nut 34d, the anti-rotation key 34e and the circlip 34f ensure that the segments 34a-b and clamping pieces 34c are held in radial position. More particularly, the two segments 34a-b and the clamping pieces 34c have respective conical seats facing each other (the inner conical surface portions for the segments and the outer conical surface portions facing each other for the clamping pieces are each oriented on a cone whose top is positioned on the axis A away from the central axis X-X', that is to say the cone is open towards the central axis X-X') which are held by bearing against each other thanks to the clamping force induced by the nut 34d on the clamping pieces 34c (the nut has an inner conical surface portion which rests on each of the inner conical surface portions of the clamping pieces, the conical surface portions each being oriented on a cone whose top is positioned on the axis A towards the central axis X-X', that is to say the cone is open away from the central axis X-X'). It should be noted that other types of mountings ensure the same function.

As represented in FIG. 4, the blade support or pivot 22 and the interface piece 30 have complementary configurations which allow them to cooperate mechanically with each other and to mount/lock and dismount/unlock the blade support relative to the interface piece from outside the hub mouth where it is integrated.

More particularly, the blade support 22 and the interface piece 30 are mutually configured to ensure, on the one hand, a clamping of the blade support against the interface piece 30 and, on the other hand, an axial retention along the radial axis A of the blade support inside the interface piece 30 in order to prevent any axial disengagement movement of the blade support relative to the interface piece 30 and tending to remove it from the hub mouth.

The blade support 22 and the interface piece 30 thus each include, on their respective surfaces intended to cooperate with each other, an alternation of conical seats and recesses making it possible alternatively, on the one hand, when the recesses of one of the two respective surfaces are in geometric correspondence with the conical seats of the other surface, to axially slide the blade support relative to the interface piece 30 and, on the other hand, when the conical seats of the two respective surfaces are in geometric correspondence with each other, to prevent any axial sliding movement of the blade support relative to the device and tending to remove the blade support from the hub mouth.

As represented in FIG. 4, the intermediate interface piece 30, only half of which (viewed from inside) obtained in an axial section being represented, includes on an inner surface a first plurality of conical seats 30d1 disposed alternately with recesses 30d2 along a circumference centered about the central axis of the piece 30 and also about the radial axis A of the hub mouth (not represented in FIG. 4). The conical seats and the recesses are substantially parallel to each other and to the central axis of the piece 30 as well as to the radial axis A. The conical seats 30d1 are oriented such that the top of the cone of each seat is directed towards the upper opening 30e of the interface piece 30, which opening is oriented towards the radial opening 16a of the mouth. Each conical seat forms a sort of ramp or slope inclined from bottom to top towards the central axis of the piece 30.

The interface piece 30 further presents here, in the vicinity of its upper opening 30e, an inner shoulder 30f forming a recess in the transverse direction relative to the radial axis A (see FIG. 3) relative to the conical seats and recesses. An angular setting pocket 30g is made in the recessed annular surface of the interface piece 30.

As an example, the interface piece includes four conical seats 30d1 and four recesses 30d2 although a different number could be envisaged.

The blade support 22 includes, for its part, on an outer surface of the central pad 22b, a second plurality of conical seats 22b1 disposed alternately with recesses 22b2 along a circumference centered about the central axis of the support 22 and also about the radial axis A of the hub mouth (not represented in FIG. 4). This configuration provides the pad/base of the support 22 with a conical dog shape.

The conical seats and the recesses are substantially parallel to each other and to the central axis of the support 22 as well as to the radial axis A.

The conical seats 22b1 have the same orientation as that of the conical seats 30d1, namely the top of the cone of each seat is directed towards the upper part 22a of the support. Each conical seat forms a sort of inclined ramp or slope starting from the top downward apart from the central axis of the support. The numbers of the conical seats and of the recesses of the support correspond to those of the interface piece.

Moreover, the support 22 includes an angular setting member 22e intended to cooperate with the angular setting pocket 30g of the interface piece 30. This member 22e extends transversely relative to the radial axis A and to the central axis of the support so as to form an element protruding externally to the outer surface of the pad of the support.

The lower part 22c of the blade support further carries, in particular at its terminal portion, outer splines 22c1 oriented parallel to the axis of the support and to its elongated dimension.

As represented in FIG. 4, the conical seats 22b1 of the blade support are disposed between the angular setting member 22e and the outer splines 22c1.

As more particularly represented in FIG. 2, an eccentric system or mechanism for controlling the pivoting of the blade support 22 is provided inside the hub 14, under the mouth 16 (for example in the vicinity of the axis X-X') and is configured to control the pivoting of the blade support 22 about the radial axis A of the mouth and therefore its angular orientation.

More particularly, the eccentric system for controlling the pivoting of the blade support comprises a piece forming an eccentric which is configured to engage with the lower protruding part 22c of the blade support in order to pivot the latter and therefore the blade it supports, on command, according to the desired pivot angle relative to the flight phase considered.

The pivoting control system comprises for example the axial control cylinder centered on the longitudinal axis X-X' and described with reference to FIG. 1. This cylinder comprises the axial rod 39 fixed relative to the structures of the turbojet engine (FIG. 1) and the movable body or chamber 40. The pivoting control system also comprises the connecting piece 41 on which several axial connecting rods 42 are connected by one of their two opposite ends (one connecting rod per blade support and per mouth and which is disposed in an inner radial position relative to the mouth). The other end of each connecting rod is connected to one end 44a of the piece forming an eccentric 44 mentioned above, here in the general shape of an elbow, and the opposite end 44b of which forms an engagement or abutment end. The axial displacement of the movable body 40 drives in translation the connecting piece 41, and therefore causes the axial translation of the connecting rods 42, which pivots the piece 44 and thus correspondingly modifies the angular orientation of the blade support and therefore of the blade.

The engagement end 44b of the eccentric 44 is configured to be removably mechanically coupled with a lower part 16c of the hub mouth which extends under the blade force take-up device 24, in addition to the mechanical coupling between the engagement end 44b and the outer splines 22c1 of the blade support 22. The lower part 16c extends, for example, from the tightened lower portion 16b2 by closing the space located below the device 24 towards the radial axis A.

More particularly, the engagement end 44b of the eccentric is configured so as to include an assembly of double concentric cylindrical wall open at its upper part towards the radial opening 16a of the mouth. This assembly comprises, on the one hand, a first outer wall 44b1, substantially cylindrical, which is removably mechanically coupled, for example with a circlip c, with the lower part 16c of the mouth (here the part 16c ends with a vertical sleeve and the outer wall 44b1 is arranged coaxially around the sleeve) and, on the other hand, a second inner wall 44b2, substantially cylindrical, which is provided on its inner face with inner splines d configured to mesh with the outer splines 22c1 of the lower part of the blade support. Other eccentric configurations provided with inner splines can alternatively be envisaged. In the configuration described (or in alternative configurations not represented), the eccentric 44 is thus placed on hold (during the mounting of the blade support) on the hub mouth before being able to be engaged mechanically, here by meshing (via the splines 22c1), with the blade support 22, as explained below with reference to FIGS. 5A-E. It will be noted that the mounting of the eccentric awaiting the blade support is optional and the meshing of the splines of the eccentric with the splines of the blade support can be achieved differently.

Moreover, the fan includes in a known manner, in its upstream part (on the left in FIG. 2), an aerodynamic cone or spinner 46 forming a cowl covering in particular the modules for mounting the fan blades and the mechanism for controlling the pivoting of the blade supports. The fan also includes, internally to the cone 46, an inner drainage cowl 48. In known manner, the blades of the fan extend radially beyond the cone 46 in order to be exposed to the flow air path surrounding the cone.

When placing the blade mounting module 20 in the hub mouth 16, the device 24 (rolling bearing cartridge) is previously introduced through the radial opening 16a into the hub mouth 16 so as to be positioned by bearing against the inner surface 16b of the mouth. The system 34 described above is placed from outside, constituent element by constituent element, starting with the segments 34a-b which are inserted into an annular groove 16c internal to the mouth (FIG. 3), for example in the vicinity of its opening 16a, the clamping pieces 34c which bear internally along a conical seat against the conical inner faces of the segments, then the clamping nut 34d, the anti-rotation key 34e and the circlip 34f. The device 24 is thus clamped against the inner surface 16b of the mouth, along a transverse direction perpendicular to the axis A.

FIGS. 5A to 5E illustrate the mounting diagram of the blade support 22 in the interface piece 30 as they have been described with reference to FIG. 4. For the sake of simplicity, the upper part of the support blade 22 has been removed.

Figure 5A:
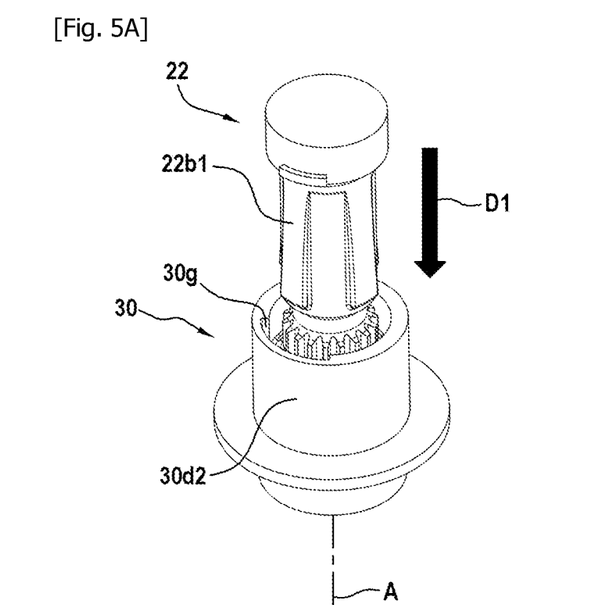
FIG. 5A illustrates in perspective a step of engaging the blade support of FIG. 4 inside the intermediate interface piece of FIG. 4.

FIG. 5A shows the axial engagement phase (along the radial axis A of the mouth) of the support 22 in a first direction of engagement F1 (here downward vertical direction) inside the interface piece 30 which is represented transparently for the sake of clarity of the locking mechanism. The support 22 is introduced axially into the central inner housing of the piece 30 by angularly orienting the support 22 such that the conical seats 22b1 of the latter are opposite (along the radial axis A) the recesses 30d2 of the interface piece 30 in order to be able to axially slide the support along the latter. During this downward movement of the support 22, the splines 22c1 pass through the splines d of the eccentric (in particular of the second wall 44b2 of the latter).

Figure 5B:
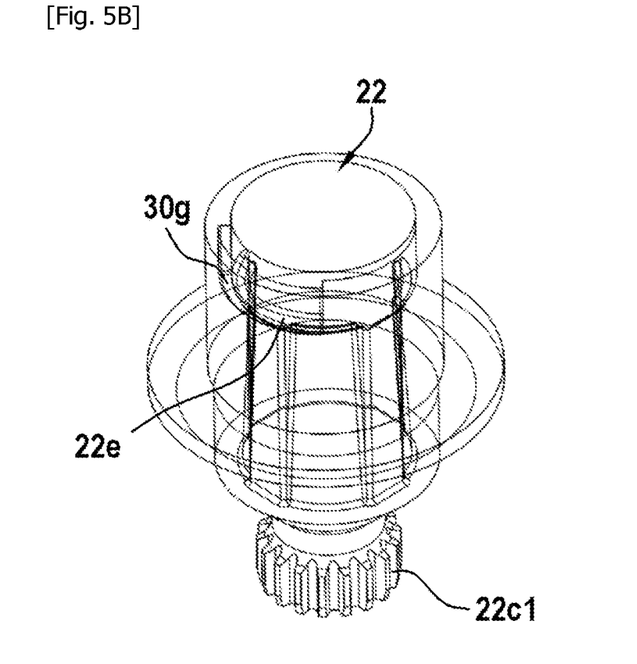
FIG. 5B illustrates in perspective a low intermediate position for axial stop of the blade support inside the intermediate interface piece.

FIG. 5B illustrates the position reached by the support 22 at the end of axial engagement. The angular setting member 22e serves to orient the blade support during the downward movement in the interface piece 30. The position of FIG. 5B is reached following the axial stop of the angular setting member 22e of the support in the pocket 30g of the piece against one of the opposite side walls of the pocket. In this intermediate position (FIG. 5B), the conical seats 22b1 of the support are positioned lower than in the desired final position of FIG. 5E in order to leave a transverse clearance (perpendicular to the radial axis A) between the respective conical seats of the support and of the interface piece. The splines 22c1 are also brought to an axial or radial position along the radial axis A which is lower than the axial or radial position of the splines d of the eccentric, thus preventing any meshing between the respective meshing elements.

Figure 5C:
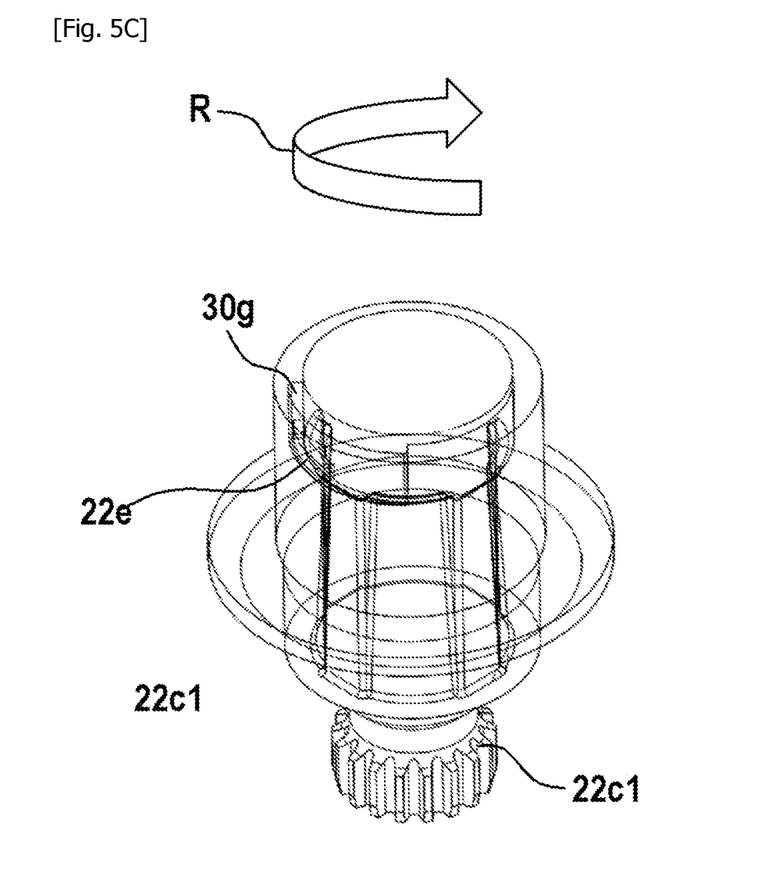
FIG. 5C illustrates in perspective a step of rotating the blade support of FIG. 5B in the low position of this figure.

Thanks to the aforementioned transverse clearance, it is possible to pivot the blade support 22 inside the piece 30, as indicated in FIG. 5C by the arrow noted R, in order to bring the angular setting member 22e in angular stop against the opposite side wall of the pocket 30g. For example, the pocket 30g extends along an angular sector of about 90°, while the setting member extends over 45°. The dimensions of this pocket, of the setting member, as well as the numbers of conical seats and recesses of the facing surfaces are defined so that the rotation of the blade support following the angular excursion of the pocket 30g brings the conical seats 22b1 of the blade support facing the conical seats 30d2 of the interface piece (angular geometric correspondence), thanks to the relative transverse clearance between them.

Figure 5D:
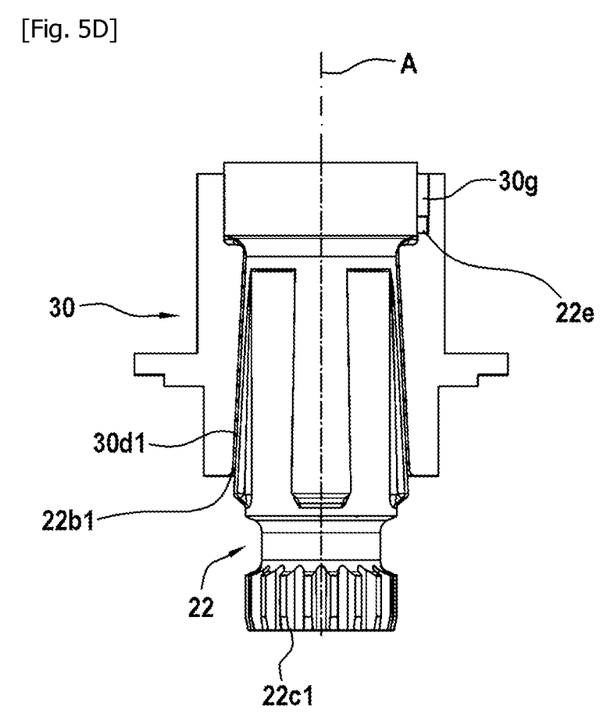
FIG. 5D represents a side view of the blade support in the low intermediate position after rotation and angular stop of FIG. 5C.
Figure 5E:
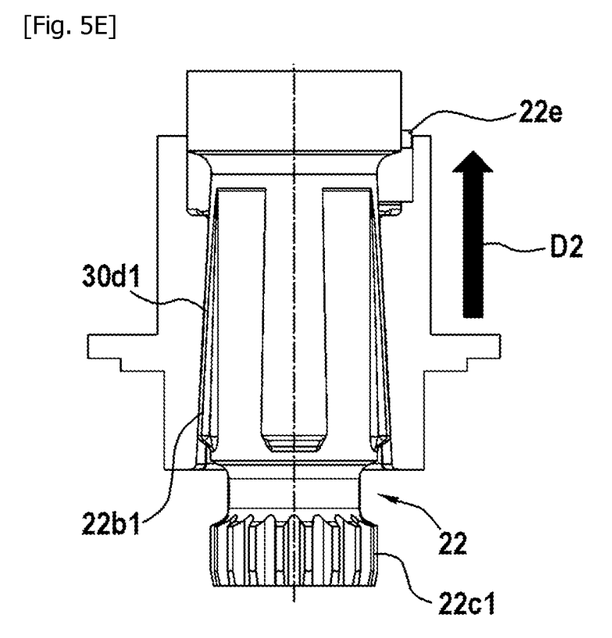
FIG. 5E illustrates a final step of raising the blade support for axial stop of the latter in the locked position inside the intermediate interface piece.

FIG. 5D illustrates the position reached by the blade support 22 at the end of the pivoting movement described in relation to FIG. 5C. From the position of FIG. 5D, the blade support 22 is driven in axial translation along a second direction D2 (disengagement) opposite to the first D1, with sufficient force, in order to bring the conical seats 22b1 of the blade support in contact with the conical seats 30d2 of the interface piece by sliding on their respective slopes, until reaching the position of FIG. 5E where the respective conical seats are in axial stop by adhesion against each other, two by two (the conical seats self-lock against each other) while the splines 22c1 of the blade support and the splines d of the eccentric line up and mesh with each other. The blade support is thus locked in the axial position and clamped against the interface piece 30. It can no longer continue its axial upward movement along the direction D2 and exit the hub mouth.

The unlocking and dismounting of the blade support can be done simply by carrying out the operations in reverse order.

It will be noted that the operations of mounting and locking the blade support in the interface piece (blade take-up device) are simplified compared to the prior art insofar as they are carried out through the outside of the hub mouth and no longer from inside the latter. In addition, the use of small pieces during the mounting, as in the prior art, is avoided, which again simplifies the operations.

The toothed engagement end 44b of the eccentric is then engaged with the outer splines 22c1 of the blade support in order to make the connection with the mechanism for pivoting the blade support. This operation is carried out from inside the hub but does not require the use of small pieces and multi-part pieces such as half-shell segments to be inserted into annular grooves. Such an operation proves difficult to carry out when the space requirement is small, which is often the case inside the fan hub.

Although the present description refers to specific exemplary embodiments, modifications can be made to these examples without departing from the general scope of the invention as defined by the claims. Furthermore, individual features of the different embodiments illustrated or mentioned may be combined in additional embodiments. Therefore, the description and drawings should be considered in an illustrative rather than restrictive sense.

The invention claimed is:

1. A module for mounting a turbomachine fan blade comprising:
   a blade force take-up device,
   a blade support intended to support a fan blade and able to pivot about a radial axis, the blade support being configured to be engaged axially along the radial axis inside the blade force take-up device, the blade support and the blade force take-up device being mutually configured to ensure both a clamping of the blade support against the device and an axial retention along the radial axis of the blade support inside the device in order to prevent any movement of axial disengagement of the blade support relative to the device, the blade support and the device each including, on their respective surfaces intended to cooperate with each other, an alternation of conical seats and recesses making it possible when the recesses of one of the two respective surfaces are in geometric correspondence with the conical seats of the other surface, to axially slide the blade support relative to the device and when the conical seats of the two respective surfaces are in geometric correspondence with each other, to prevent any axial sliding movement of the blade support relative to the device.

2. The mounting module according to claim 1, wherein the blade force take-up device comprises an intermediate interface piece which includes, on an inner surface, a first plurality of conical seats disposed alternately with recesses circumferentially and coaxially with the radial axis of the blade support, the conical seats being oriented such that a top of the cone of each seat is directed towards a radial opening of the blade support.

3. The mounting module according to claim 2, wherein the blade support includes, on an outer surface, a second plurality of conical seats disposed alternately with recesses circumferentially and coaxially with the radial axis of the blade support, the conical seats of the second plurality of conical seats having a same orientation as that of the first plurality of conical seats.

4. The mounting module according to claim 1, wherein the mounting module includes at least one angular setting member on a first element of two elements among the blade support and the device, said at least one angular setting member being intended to cooperate with an angular setting pocket arranged on a second element of the two elements and extending transversely relative to the radial axis.

5. A variable-setting assembly for a turbomachine fan, comprising:
   a hub extending circumferentially about a longitudinal axis of rotation of the hub and comprising a plurality of hub mouths distributed circumferentially on an outer periphery of the hub, each hub mouth internally delimiting an opening oriented radially relative to the longitudinal axis and allowing access to an inside of the hub mouth,
   for each hub mouth, a module for mounting a fan blade according to claim 1.

6. The assembly according to claim 5, wherein it includes an eccentric system for controlling the pivoting of the blade support, which is configured to control the pivoting of the blade support about the radial axis of the hub mouth.

7. The assembly according to claim 6, wherein the eccentric system for controlling the pivoting of the blade support comprises a piece forming an eccentric which is configured to engage with a lower part of the blade support which is opposite to an upper part of the blade support disposed in a radial position remote from the longitudinal axis and intended to receive a fan blade.

8. The assembly according to claim 7, wherein the lower part of the blade support carries outer splines which are configured to mesh with inner splines of an engagement end of the eccentric.

9. The assembly according to claim 8, wherein the engagement end of the eccentric has a general shape of a cylindrical pad open at its upper part oriented towards the radial opening of the mouth and which is provided, on its internal surface, with the inner splines.

10. The assembly according to claim 8, wherein the outer splines of the lower part of the blade support are disposed at a distance, taken along the radial axis, from the conical seats of the blade support which is such that the outer splines are in geometric correspondence with the inner splines of the engagement end when the respective conical seats of the blade support and of the device are in geometric correspondence with each other.

11. The assembly according to claim 5, wherein the mounting module includes at least one angular setting member on a first element of two elements among the blade support and the device, said at least one angular setting member being intended to cooperate with an angular setting pocket arranged on a second element of the two elements and extending transversely relative to the radial axis, the conical seats of the blade support being disposed between the angular setting member or angular setting pocket, depending on whether the member is carried by the blade support or the device, and outer splines.

12. The assembly according to claim 8, wherein the engagement end of the eccentric is also configured to be removably mechanically coupled with a lower part of the hub mouth which is opposite to the radial opening of the latter.

13. The assembly according to claim 12, wherein the engagement end of the eccentric includes an assembly of double concentric cylindrical walls open at its upper part towards the radial opening of the mouth and comprising both a first outer wall which is removably mechanically coupled with the lower part of the mouth and a second inner wall which is provided on its inner face with the splines configured to mesh with the outer splines of the lower part of the blade support.

14. A turbomachine fan, wherein it comprises a variable-setting assembly for a turbomachine fan according to claim 5.

15. The turbomachine fan according to claim 14, wherein the fan comprises a plurality of fan blades each mounted on a blade support of a mounting module of a hub mouth.

16. A turbomachine comprising a turbomachine fan according to claim 14.

* * * * *